UNITED STATES PATENT OFFICE.

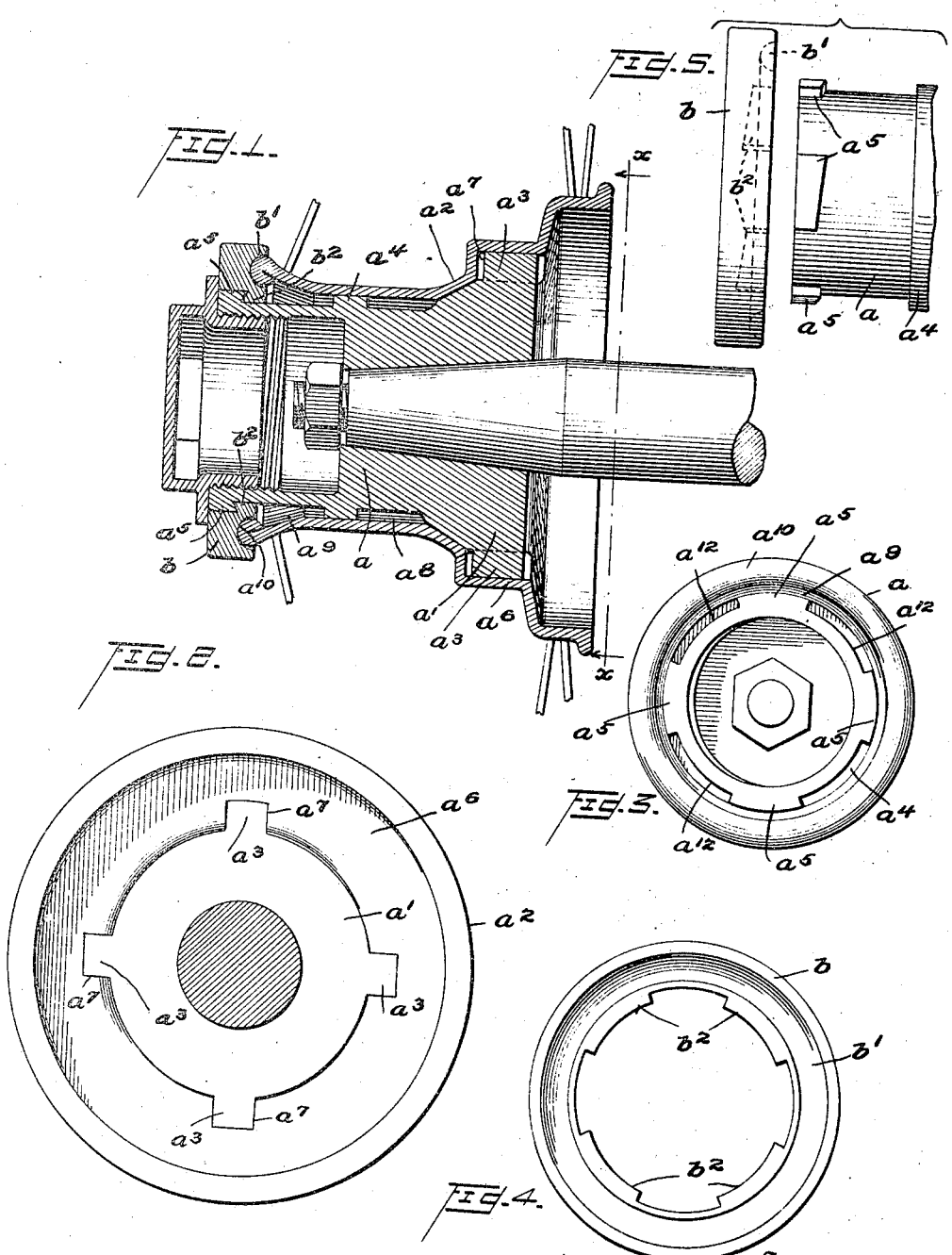

RICHARD A. PENROSE, OF PHILADELPHIA, PENNSYLVANIA.

DETACHABLE VEHICLE-WHEEL.

1,320,170.   Specification of Letters Patent.   Patented Oct. 28, 1919.

Application filed January 14, 1918.  Serial No. 211,770.

*To all whom it may concern:*

Be it known that I, RICHARD A. PENROSE, a citizen of the United States, residing at the city of Philadelphia, in the county of Philadelphia and State of Pennsylvania, have invented certain new and useful Improvements in Detachable Vehicle-Wheels, of which the following is a specification.

My present invention relates to a hub for a quick detachable wire or other type of vehicle wheel; and in such connection it relates particularly to the arrangement of the inner hub-member and the outer shell-member, so as to interlockingly telescope one with the other in preventing independent rotation and thus an efficient quick demountable hub for a vehicle driving or other wheel.

The principal object of my present invention, is to provide a composite vehicle wheel-hub, consisting of two separable telescoping members with recesses and lugs in rear arranged to lockingly engage one another against rotation separately; the front of one of said members is arranged with lugs to engage a locking-means in the emplacement of such means about the lugs of said inner hub-member to automatically secure both members against detachment, in rotation of the wheel.

The nature and scope of my invention will be more fully understood from the following description taken in connection with the accompanying drawings forming part hereof, in which, Figure 1, is a view partly in elevation and partly in longitudinal section of a detachable vehicle-wheel, embodying essential main features in general constructive arrangement of my said invention.

Fig. 2, is a vertical sectional view on the line $x$, $x$, of Fig. 1, showing the interlocking features of the rear portion respectively of the inner and outer telescoping members of the wheel-hub and providing an efficient hub for the "driving" or other wheel of a vehicle.

Fig. 3, is a front end view of the composite hub, consisting of two telescoping members lockingly held to each other.

Fig. 4, is a similar view of the composite hub locking ring-means; and

Fig. 5, is a plan view of the inner hub member having beveled lugs formed therewith and recesses formed between the lugs and the locking-means arranged to enter the recesses and to embrace the beveled lugs of the inner hub-member so as to become lockingly engaged therewith against flying off or detachment of the telescoped members of the said composite hub.

Referring to the drawings, the composite wheel hub, comprises an inner member $a$, and a shell member $a^2$, telescoping with each other.

The inner member $a$, is formed with a circular rear boss $a^1$, and a series of lugs $a^3$. This member is arranged partly tapering in outline toward the front and between the front and rear extremities is provided a circular shoulder $a^4$, and at the front extremity is arranged a series of beveled lugs $a^5$, all for purposes to be presently more fully explained.

The shell member $a^2$, is provided with an enlarged rear extremital part $a^6$, and in the body of the enlarged part of said member are arranged a series of oblong slots or recesses $a^7$. This member is provided with a bore surface $a^8$, slanting in diameter to the front whereat is arranged preferably an inturned circular end as the termination of the outwardly slanting beveled surface $a^9$. Rearwardly of the beveled surface $a^9$, the bore surface $a^8$, of the shell member is arranged cylindrical to snugly engage the shoulder $a^4$, of the inner member $a$, therewith, while the slots or recesses $a^7$, receive and firmly engage the inner member lugs $a^3$, when the two members have been telescoped with each other, as shown in Fig. 1. The circular inturned end $a^{10}$, as so arranged is provided to snugly fit the groove $b^1$, of the locking-ring means $b$, and entering the lugs $b^2$, in the rear of the lugs $a^5$, after first alining the same with the recesses $a^{12}$, of the inner member $a$, and turning slightly the said locking-ring $b$ permits instantly the lugs $b^2$, of the locking-ring $b$, to engage the lugs $a^5$, of the said inner member $a$. This emplacement and turning of the said locking-ring $o$, permits of the inner member $a$, to be securely held to the shell member $a^1$, against detachment from the inner member $a$. The foregoing arrangement provides an efficient quick detachable vehicle wheel-hub. A hub for a vehicle driving wheel which is free from wear as well as rattle. Moreover, a wheel-hub reliably safeguarded against possible detachment, yet when requirements demand a hub is provided which is readily demountable, that is, quick detachment of one member of such composite wheel-hub from the other telescoping member of the same.

The front of the inner hub-member $a$, in position is fitted with a dust or mud cap $c$, as shown in Fig. 1, which absolutely safeguards the said members against their detachment or flying off, in action of the wheel.

Having thus described the nature and object of my invention, what I claim as new and desire to secure by Letters Patent is:—

A composite wheel hub, consisting of two telescoping members, the inner member being of greater diameter in the rear than in the front, and in the rear formed with lugs, distanced apart about the same, said member provided intermediate of its length with a shoulder and beyond the latter toward the front said member offset and terminating in a flanged extremity having the inner side thereof beveled and the interior surface threaded, the outer hub-member formed in the rear with recesses complemental in form to those of the lugs of said inner hub-member, arranged so as to snugly engage each other against separable rotation of said members, a lock-ring the interior having lugs with one surface beveled and one side grooved for engaging the edge of said outer member and a flanged cap with a threaded sleeve for engaging said inner member, the flange of said cap arranged to contact with the front of said inner-member and the surface of said lock-ring, the combined arrangement of the composite hub being such, that the telescoping of the two hub-members, and emplacement of the lock-ring with the respective beveled surfaces of the inner hub-member and lock-ring in engagement automatically locks the same against rotation and the applying of the cap prevents the disengagement of said lock-ring and inner hub-member, substantially as described.

In witness whereof, I have hereunto set my signature in the presence of two subscribing witnesses.

RICHARD A. PENROSE.

Witnesses:
J. WALTER DOUGLASS,
MARIAN GROOM.